US012809570B2

(12) United States Patent
Kim et al.

(10) Patent No.: US 12,809,570 B2
(45) Date of Patent: Nov. 24, 2026

(54) ELECTRONIC APPARATUS AND CONTROL METHOD THEREOF

(71) Applicant: SAMSUNG ELECTRONICS CO., LTD., Suwon-si (KR)

(72) Inventors: Minsang Kim, Suwon-si (KR); Hyunjong Shin, Suwon-si (KR); Seokhyun Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 734 days.

(21) Appl. No.: 18/108,178

(22) Filed: Feb. 10, 2023

(65) Prior Publication Data

US 2023/0195405 A1 Jun. 22, 2023

Related U.S. Application Data

(63) Continuation of application No. PCT/KR2021/010323, filed on Aug. 5, 2021.

(30) Foreign Application Priority Data

Aug. 13, 2020 (KR) ........................ 10-2020-0101791

(51) Int. Cl.
*G10L 21/00* (2013.01)
*G06F 3/16* (2006.01)
(Continued)

(52) U.S. Cl.
CPC .............. *G06F 3/16* (2013.01); *G10L 19/005* (2013.01); *H04R 29/001* (2013.01)

(58) Field of Classification Search
CPC .................. H04R 1/1041; H04R 29/00; H04R 2227/005; H04R 2420/05; H04R 29/001;
(Continued)

(56) References Cited

U.S. PATENT DOCUMENTS 9,578,210 B2 2/2017 Lee et al.
10,230,918 B2 * 3/2019 Higuchi ............ H04N 21/4367
(Continued)

FOREIGN PATENT DOCUMENTS

JP 2011-166198 8/2011
JP 2016-116030 A 6/2016
(Continued)

OTHER PUBLICATIONS

Korean Office Action dated Jun. 9, 2025 for KR Application No. 10-2020-0101791.
(Continued)

*Primary Examiner* — Michael Ortiz-Sanchez
(74) *Attorney, Agent, or Firm* — Nixon & Vanderhye P.C.

(57) ABSTRACT

A method for controlling an electronic apparatus connected to a source device and a sound output device. A method for controlling an electronic apparatus may include steps of: receiving content of a source device and providing audio data of the content to a sound output device; when the audio data of the content is not output in the sound output device, diagnose, on the basis of an audio mode of the electronic apparatus, an output error of at least one from among the source device and the sound output device; perform, on the basis of a result of the diagnosis, reconnection to at least one from among the source device and the sound output device; and when the audio data of the content is not output in the second output device even after the reconnection, change the audio mode.

15 Claims, 9 Drawing Sheets

(51) Int. Cl.
*G10L 19/005* (2013.01)
*G10L 25/00* (2013.01)
*H04R 29/00* (2006.01)

(58) Field of Classification Search
CPC ........... H04M 1/2535; H04M 1/72442; H04M 1/72409; G06F 3/167; G06F 3/165; G06F 3/16; G06F 3/04847; G10L 19/005; G10L 19/008; G10L 19/22; G11B 20/10527; H04L 2012/2849; H04L 1/0002; H04L 49/206; H04L 49/201; H04L 49/557; H04L 65/1059; H04L 65/1101; H04B 17/309
See application file for complete search history.

(56) References Cited

U.S. PATENT DOCUMENTS

| | | | | |
|---|---|---|---|---|
| 10,681,462 | B2 | 6/2020 | Lee et al. | |
| 2015/0077633 | A1 | 3/2015 | Lee et al. | |
| 2015/0103253 | A1* | 4/2015 | Higuchi | H04N 5/602 348/705 |
| 2016/0142455 | A1 | 5/2016 | Hariharan et al. | |
| 2018/0176748 | A1* | 6/2018 | Kim | H04L 63/0861 |
| 2019/0098410 | A1 | 3/2019 | Lee et al. | |
| 2021/0281950 | A1* | 9/2021 | Park, IV | G10L 15/22 |
| 2022/0083310 | A1* | 3/2022 | Lynch | H04L 67/12 |
| 2022/0188065 | A1* | 6/2022 | Crawford | G06F 3/165 |

FOREIGN PATENT DOCUMENTS

| | | | | |
|---|---|---|---|---|
| JP | 2018-107497 A | 7/2018 | | |
| JP | 6657066 | 3/2020 | | |
| JP | 6659949 | 3/2020 | | |
| KR | 10-1998-0048193 | 9/1998 | | |
| KR | 10-2008-0032794 | 4/2008 | | |
| KR | 10-2012-0037580 | 4/2012 | | |
| KR | 10-2013-0112306 | 10/2013 | | |
| KR | 10-1327214 | 11/2013 | | |
| KR | 10-2014-0118425 | 10/2014 | | |
| KR | 10-2015-0030946 | 3/2015 | | |
| KR | 10-2019-0033864 | 4/2019 | | |
| WO | WO-2014040667 A1 * | 3/2014 | | H04R 27/00 |
| WO | 2019/125920 | 6/2019 | | |

OTHER PUBLICATIONS

International Search Report for PCT/KR2021/010323 mailed Nov. 24, 2021, 4 pages.

Written Opinion of the ISA for PCT/KR2021/010323 mailed Nov. 24, 2021, 3 pages.

* cited by examiner

ELECTRONIC APPARATUS AND CONTROL METHOD THEREOF

CROSS-REFERENCE TO RELATED APPLICATIONS

This application is a continuation of International Application No. PCT/KR2021/010323, filed on Aug. 5, 2021, designating the United States, in the Korean Intellectual Property Receiving Office, and claiming priority to Korean Patent Application No. 10-2020-0101791, filed on Aug. 13, 2020, in the Korean Intellectual Property Office, the disclosures of which are all hereby incorporated by reference herein in their entireties.

BACKGROUND

Field

Certain example embodiments relate to an electronic apparatus and/or a control method thereof. For example, an electronic apparatus which is connected to a source device and a sound output device and provides audio data of a content received from the source device to the sound output device and a control method thereof.

Description of Related Art

With an increase of users wanting to use content of high-resolution or high-quality sound, there is an increase of demand for a sink device with a High-Definition Multimedia Interface (HDMI) port. In addition, as a thickness of the sink device, such as a TV, becomes thinner, output of a speaker on its own is reduced and there is an increase of interest by users for a sound output device.

HDMIs of recent support enhanced Audio Return Channel (eARC) which is enhanced compared to Audio Return Channel (ARC) for a high-quality sound content. Accordingly, users may receive a high-quality sound service through the HDMI. However, when using a sink device that supports eARC, problems such as compatibility issues between the source device or the sound output device which connects with the sink device have occurred leading to issues of not being able to use eARC according to an intent of a user, and in certain cases, issues of sound not being output from the sound output device have occurred.

SUMMARY

Certain example embodiments address at least the above-mentioned problems and/or disadvantages, and/or provide an electronic apparatus which can diagnose an output error in a situation of sound not being output from a sound output device and a control method thereof.

According to an example embodiment, a control method of an electronic apparatus connected with a source device and a sound output device may include receiving content of the source device and providing audio data of the content to the sound output device, diagnosing, based on audio data of the content not being output from the sound output device, at least one output error from among the source device or the sound output device based on an audio mode of the electronic apparatus, performing reconnection of at least one from among the source device or the sound output device based on the diagnosis result, and changing, based on audio data of the content not being output from the sound output device even after the reconnection, the audio mode.

According to an example embodiment, an electronic apparatus may include a communication interface configured to perform communication with a source device and a sound output device, and a processor which may be configured to control the communication interface to receive a content of the source device and provide audio data of the content to the sound output device, diagnose, based on audio data of the content not being output from the sound output device, at least one output error from among the source device or the sound output device based on an audio mode of the electronic apparatus, perform reconnection of at least one from among the source device or the sound output device based on the diagnosis result, and change, based on audio data of the content not being output from the sound output device even after the reconnection, the audio mode.

According to an example embodiment, a computer readable recording medium including a program for executing a control method of an electronic apparatus is described, and the control method of the electronic apparatus may include receiving content of the source device and providing audio data of the content to the sound output device, diagnosing, based on audio data of the content not being output from the sound output device, at least one output error from among the source device or the sound output device based on an audio mode of the electronic apparatus, and performing reconnection of at least one from among the source device or the sound output device based on the diagnosis result.

BRIEF DESCRIPTION OF DRAWINGS

The above and other aspects, features, and advantages of certain example embodiments of the present disclosure will be more apparent from the following detailed description, taken in conjunction with the accompanying drawings, in which.

DETAILED DESCRIPTION

Figure 1:
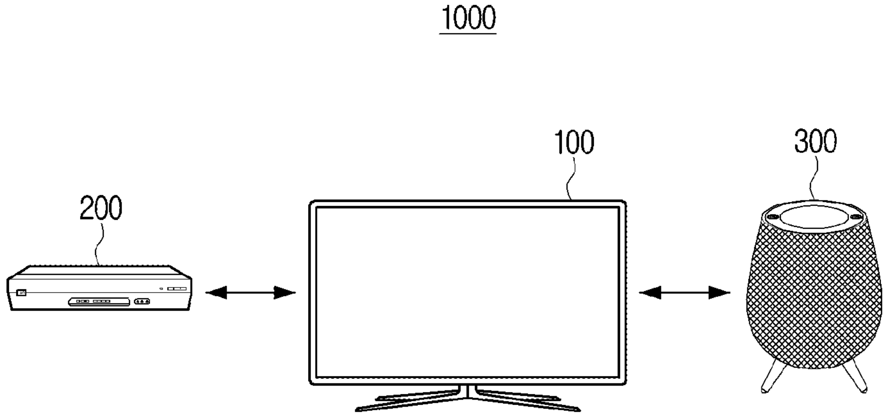
FIG. 1 is a diagram illustrating a display system according to an example embodiment.

The terms used in describing the various embodiments of the disclosure are general terms selected that are currently widely used considering their function herein. However, the terms may change depending on intention, legal or technical interpretation, emergence of new technologies, and the like of those skilled in the related art. Further, in certain cases, there may be terms arbitrarily selected. In this case, the meaning of the term may be interpreted as defined in the description, and if there is no specific definition of the term, the meaning of the term may be interpreted based on the overall context of the disclosure and the technical common sense according to the related art.

Various embodiments of the disclosure have been described below taking into reference the accompanied drawings. However, it should be noted that the various embodiments are not for limiting the scope of the disclosure to a specific embodiment, but should be interpreted to include all modifications, equivalents or alternatives of the embodiments.

In addition, like reference numerals or symbols shown in each accompanied drawing indicate components or elements that perform substantially the same function. For convenience of descriptions and understanding, the same reference numerals or symbols may be used and described in different embodiments. That is, although elements having the same reference numerals are all shown in a plurality of drawings, the plurality of drawings do not indicate just one embodiment.

In the disclosure, a singular expression includes a plural expression, unless otherwise specified. It is to be understood that the terms such as "comprise" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

In the disclosure, expressions such as "have," "may have," "include," "may include," or the like are used to designate a presence of a corresponding characteristic (e.g., elements such as numerical value, function, operation, or component), and not to preclude a presence or a possibility of additional characteristics.

In the disclosure, expressions such as "A or B," "at least one of A and/or B," or "one or more of A and/or B" may include all possible combinations of the items listed together. For example, "A or B," "at least one of A and B," or "at least one of A or B" may refer to all cases including (1) at least one A, (2) at least one B, or (3) both of at least one A and at least one B.

Expressions such as "first," "second," "1st," "2nd," and so on used herein may be used to refer to various elements regardless of order and/or importance, and it should be noted that the expressions are merely used to distinguish an element from another element and not to limit the relevant elements. In an example, elements combined with ordinal numbers as described above are not to be limited by the number in terms of order of use, order of arrangement, and the like. If necessary, each ordinal number may be used interchangeably.

When a certain element (e.g., first element) is indicated as being "(operatively or communicatively) coupled with/to" or "connected to" another element (e.g., second element), it may be understood as the certain element being directly coupled with/to the another element or as being coupled through at least another element (e.g., at least a third element therebetween). On the other hand, when a certain element (e.g., first element) is indicated as "directly coupled with/to" or "directly connected to" another element (e.g., second element), it may be understood as the other element (e.g., third element) not being present between the certain element and the another element.

The expression "configured to . . . (or set up to)" used in the disclosure may be used interchangeably with, for example, "suitable for . . . ," "having the capacity to . . . ," "designed to . . . ," "adapted to . . . ," "made to . . . ," or "capable of . . . " based on circumstance. The term "configured to . . . (or set up to)" may not necessarily mean "specifically designed to" in terms of hardware. Rather, in a certain circumstance, the expression "a device configured to . . . " may mean something that the device "may perform . . . " together with another device or components. For example, the phrase "a sub-processor configured to (or set up to) perform A, B, or C" may mean a dedicated processor for performing a corresponding operation (e.g., embedded processor), or a generic-purpose processor (e.g., a central processing unit (CPU) or an application processor) capable of performing the corresponding operations by executing one or more software programs stored in the memory device.

In this disclosure, the term "user" may refer to a person using an electronic device or a device (e.g., artificial intelligence electronic device) using an electronic device.

Certain example embodiments will be described in greater detail below with reference to the accompanied drawings.

FIG. 1 is a diagram illustrating a display system according to an example embodiment.

As shown in FIG. 1, a display system 1000 may include an electronic apparatus 100, a source device 200, and a sound output device 300.

The source device 200 may provide content to the electronic apparatus 100. Here, the source device 200 may be implemented as various types of devices that can provide content to the electronic apparatus 100 such as, for example, and without limitation, a set-top box, a Digital Versatile Disc (DVD) player, a Blu-ray disc player, a personal computer (PC), a gaming device, and the like, and the electronic apparatus 100 may be implemented as a display device of various types that can output content received from source devices 200 such as, for example, and without limitation, a television (TV), a smart TV, a network TV, a web TV, an Internet Protocol Television (IPTV), a wall system of or including a plurality of display devices, and the like. Although the electronic apparatus 100 may be implemented as a display device, it may be implemented to a form that provides a display by reproducing content when a display is separately provided.

The source device 200 may be implemented as a device supporting a High Definition Multimedia Interface (HDMI). The source device 200 and the electronic apparatus 100 may include a HDMI port and perform communication with each other through a HDMI method.

The HDMI maybe one of a digital video or audio interface standard of an uncompression method, and may provide an interface between the source device, the display device and the sound output devices which support the HDMI. The HDMI may be of or include communication channels such as, for example, and without limitation Transition Minimized Differential Signaling (TMDS), Display Data Channel (DDC), Consumer Electronics Control (CEC), and the like, and may transmit and receive image and audio signals, device information, control commands, and the like through the above. In addition, the HDMI may perform an Audio Return Channel (ARC) function and an enhanced Audio Return Channel (eARC) through a HDMI Ethernet Audio Return Channel (HEAC), and perform a plug and play function through a Hot Plug Detection (HPD).

The HDMI based Audio Return Channel (ARC) may be a function added from HDMI standard 1.4 version, and may be a method of transmitting an audio signal from an audio processing device (or sink device) (e.g., electronic apparatus 100) to an audio output device using one HDMI cable. Accordingly, the audio processing device such as a TV may receive an image signal using one HDMI cable, and transmit an audio signal to the audio output device.

The HDMI based enhanced Audio Return Channel (eARC) may be a function added from HDMI standard 2.1 version, and the audio processing device which uses an eARC function because of a higher bandwidth than the ARC (ARC: 1 Mbit/sec, eARC: 37 Mbits/sec) may transmit audio data of high-quality sound to the audio output device without compression.

The electronic apparatus 100 may extract audio data from content received from the source device 200 and transmit to the sound output device 300. In the disclosure, the sound output device 300 may receive audio data from the electronic apparatus 100 (audio processing device or sink device) such as a speaker, a speaker bar, a Bluetooth speaker, and an audio/video receiver (A/V receiver), and may be implemented as a device of various types that can output sound by changing the received audio data to sound.

The electronic apparatus 100 may change the extracted audio data to a format suitable for the audio output mode and transmit to the sound output device 300. Specifically, the electronic apparatus 100 may change the audio data to a format suitable for eARC or a format suitable for ARC based on whether the eARC function or the ARC function is activated, and transmit the changed audio data to the sound output device 300.

The sound output device 300 may change eARC audio data changed to a format corresponding to eARC or ARC audio data changed to a format corresponding to ARC to sound and output the sound.

In certain cases, cases of sound not being output from the sound output device 300 may occur. For example, if the electronic apparatus 100 transmitted eARC audio data to the sound output device 300 but the sound output device 300 does not support eARC audio data, or if an error is present in the audio data transmitted from the source device 200 to the electronic apparatus 100, sound may not be output from the sound output device 300 due to various reasons such as a cable connection error between the source device 200 and the electronic apparatus 100, or a cable connection error between the sound output device 300 and the electronic apparatus 100. Here, there may be various error reasons for sound not being output from the sound output device 300 and is not necessarily limited to the above-described example.

The electronic apparatus 100 may determine that an error is present in a sound output when sound is not output from the sound output device 300, and check whether a reason for a sound output error is present in the source device 200, the sound output device 300, or the electronic apparatus 100. Further, a reconnection with the source device 200 or the sound output device 300 may be performed, or an audio output mode of the electronic apparatus 100 may be changed.

Accordingly, various embodiments of the electronic apparatus checking the reason for the sound output error and performing reconnection with the source device 200 or the sound output device 300, or changing the audio output mode of the electronic apparatus 100 will be described below.

Figure 2:
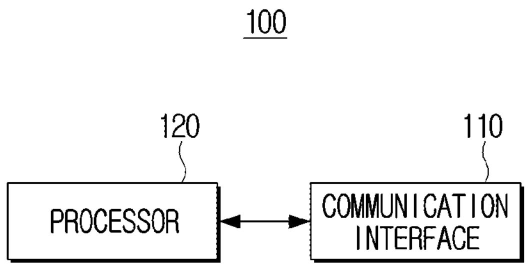
FIG. 2 is a block diagram illustrating a configuration of an electronic apparatus according to an example embodiment.

FIG. 2 is a block diagram illustrating a configuration of an electronic apparatus according to an example embodiment.

As shown in FIG. 2, the electronic apparatus 100 may include a communication interface 110 and a processor 120.

The communication interface 110 may be an element for the electronic apparatus 100 to perform communication with the source device 200 and the sound output device 300. The communication interface 110 may receive a high-resolution video and a multi-channel digital audio from the source device 200 through one cable, or may be implemented as a HDMI port for transmitting an audio channel to the sound output device 300. Specifically, the communication interface 110 may include a Transition Minimized Differential Signaling (TMDS) channel which receives input of video and audio signals, a Display Data Channel (DDC) for receiving information (e.g., Enhanced Extended Display Identification Data (E-EDID)) associated with device information, a video, or an audio from the connected source device 200, and a Consumer Electronic Control (CEC) which transfers a control signal to the source device 200 or the sound output device 300.

Specifically, the communication interface 110 may be implemented as a HDMI input port and a HDMI output port that supports the HDMI standard. Here, the HDMI port of each version may have a backward compatibility. Accordingly, a source device of upper standard and a sound output device of a lower standard may be connected and used or vice versa. However, in this case, only functions corresponding to the lower standard may be used for both devices. In an example, even if the electronic apparatus 100 (e.g., TV) supports a function associated with HDMI 2.1, if the source device 200 (e.g., Blu-ray player) supports a function associated with HDMI 2.0, the electronic apparatus 100 and the source device 200 may both use functions associated with HDMI 2.0.

Figure 3:
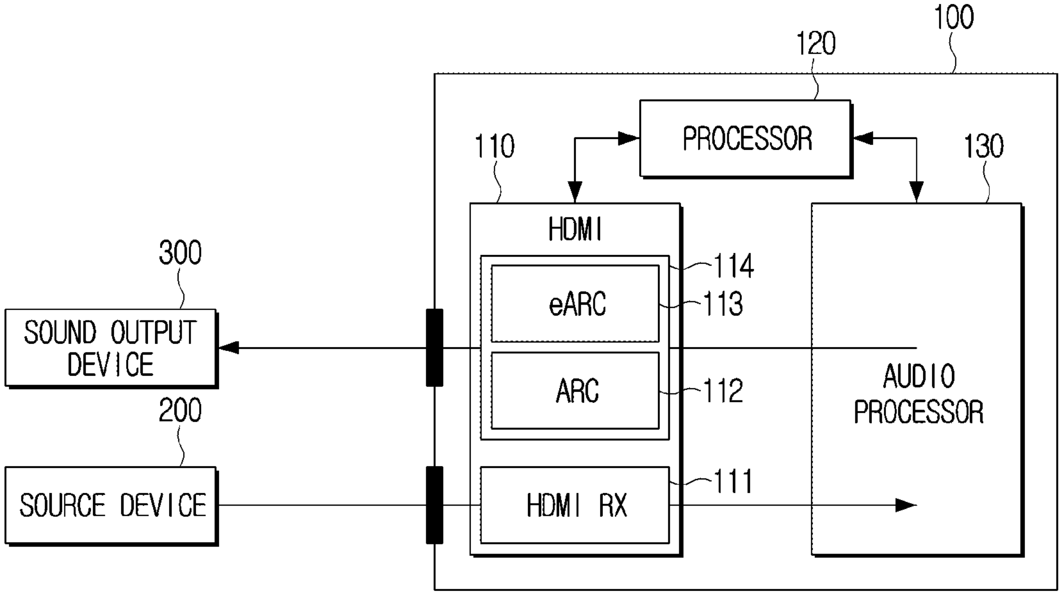
FIG. 3 is a diagram illustrating an operation of an electronic apparatus according to an example embodiment.

As shown in FIG. 3, the communication interface 110 may include a HDMI Receiver (HDMI Rx) 111, and an audio transmitter 114 which includes an ARC transmitter 112 and an eARC transmitter 113.

The HDMI Rx 111 may be connected with a HDMI transmitter (not shown) of the source device 200 through the HDMI cable and receive data transmitted by the HDMI transmitter (not shown). The HDMI Rx 111 may receive the signal transmitted by the HDMI transmitter (not shown) of the source device 200 through various channels such as the Transition Minimized Differential Signaling (TMDS), the DDC (Display Data Channel), and the Consumer Electronic Control (CEC). The HDMI Rx 111 may extract audio data from a Transition Minimized Differential Signaling (TMDS) signal included in a content received from the source device 200 and transmit to an audio processor 130.

The audio transmitter 114 may include the ARC transmitter 112 and the eARC transmitter 113, and receive audio data from the audio processor 130. The audio transmitter 114 may transmit the audio data using the ARC transmitter 112 or the eARC transmitter 113 according to a type of the audio data received from the audio processor 130. In the disclosure, although the audio transmitter 114 is shown as including the ARC transmitter 112 and the eARC transmitter 113, the embodiment is not necessarily limited thereto, and other configurations may be included according to the type of audio data that is transmittable to the audio transmitter 114.

The ARC transmitter 112 may transmit ARC audio data received from the audio processor 130 to the sound output device 300 through the HDMI cable, and the eARC transmitter 113 may transmit eARC audio data received from the audio processor 130 to the sound output device 300 through the HDMI cable.

Because the processor 120 in FIG. 2 and FIG. 3 is the same configuration, the processor 120 in FIG. 2 and FIG. 3 will be described together to avoid redundant description.

The processor 120 may control the overall operation of the electronic apparatus 100. The processor 120 may function controlling the overall operation of the electronic apparatus 100. Here, the processor 120 may include one or more from among a central processing unit (CPU), digital signal processor (DSP), a microprocessor, a Time controller (TCON), a micro processing unit (MPU), a controller, an application processor (AP), or a communication processor (CP), or may be defined by the corresponding term. In addition the processor 120 may be implemented as a System of Chip (SoC) or a large scale integration (LSI) in which a processing algorithm is embedded, and may be implemented in the form of a field programmable gate array (FPGA). Each processor herein comprises processing circuitry.

The processor 120 may control the communication interface 110 to receive content received from the source device 200, and transmit audio data included in the content to the sound output device 300.

The processor 120 may receive content from the source device 200 through the HDMI Rx 111, and control the HDMI Rx 111 to extract audio data from the received content and to transmit the extracted audio data to the audio processor 130.

The processor 120 may change audio data according to an audio mode of the electronic apparatus 100 by using the audio processor 130. Here, the audio mode may include an Audio Return Channel (ARC) mode, an enhanced Audio Return Channel (eARC) mode, and an embedded speaker mode. The embedded speaker mode may indicate a mode of outputting audio data through a speaker (not shown) included in the electronic apparatus 100, and not the sound output device 300. In the disclosure, although the audio mode of the electronic apparatus 100 is limited to the eARC mode, the ARC mode, and the embedded speaker mode, the audio mode is not necessarily limited thereto, and may vary according to a type of the audio channel or an audio form that is supportable by the electronic apparatus 100.

The audio processor 130 may be an element for performing signal processing on input audio data (audio signal) and changing the audio data to a form that is outputtable from an embedded speaker or the sound output device 300 of the electronic apparatus 100.

The processor 120 may identify the audio mode (e.g., ARC mode, eARC mode, embedded speaker mode, etc.) of the electronic apparatus 100, and control the audio processor 130 for the audio data to be changed based on the identified audio mode. Audio format information according to the audio mode of the electronic apparatus 100 may be pre-stored in a memory (not shown), and the processor 120 may control the audio processor 130 to change audio data using the audio format information according to the audio mode.

Based on the audio data changed by the audio processor 130 being transferred to the audio transmitter 114, the processor 120 may control the audio transmitter 114 to transmit the changed audio data to the sound output device 300.

Because of an error that is generated in a process of transmitting audio data, the audio data may not be transferred to the sound output device 300. Alternatively, although the audio data is transmitted to the sound output device 300, the transmitted audio data may not be output from the sound output device 300.

The processor 120 may diagnose, based on the audio data received from the source device 200 not being output from the sound output device 300, at least one output error from among the source device 200 or the sound output device 300 based on the audio mode of the electronic apparatus 100, and perform reconnection of at least one from among the source device 200 or the sound output device 300 based on a diagnosis result.

Then, the processor 120 may change, based on audio data of a content not being output from the sound output device 300 even after reconnection, the audio mode of the electronic apparatus 100.

Figure 4:
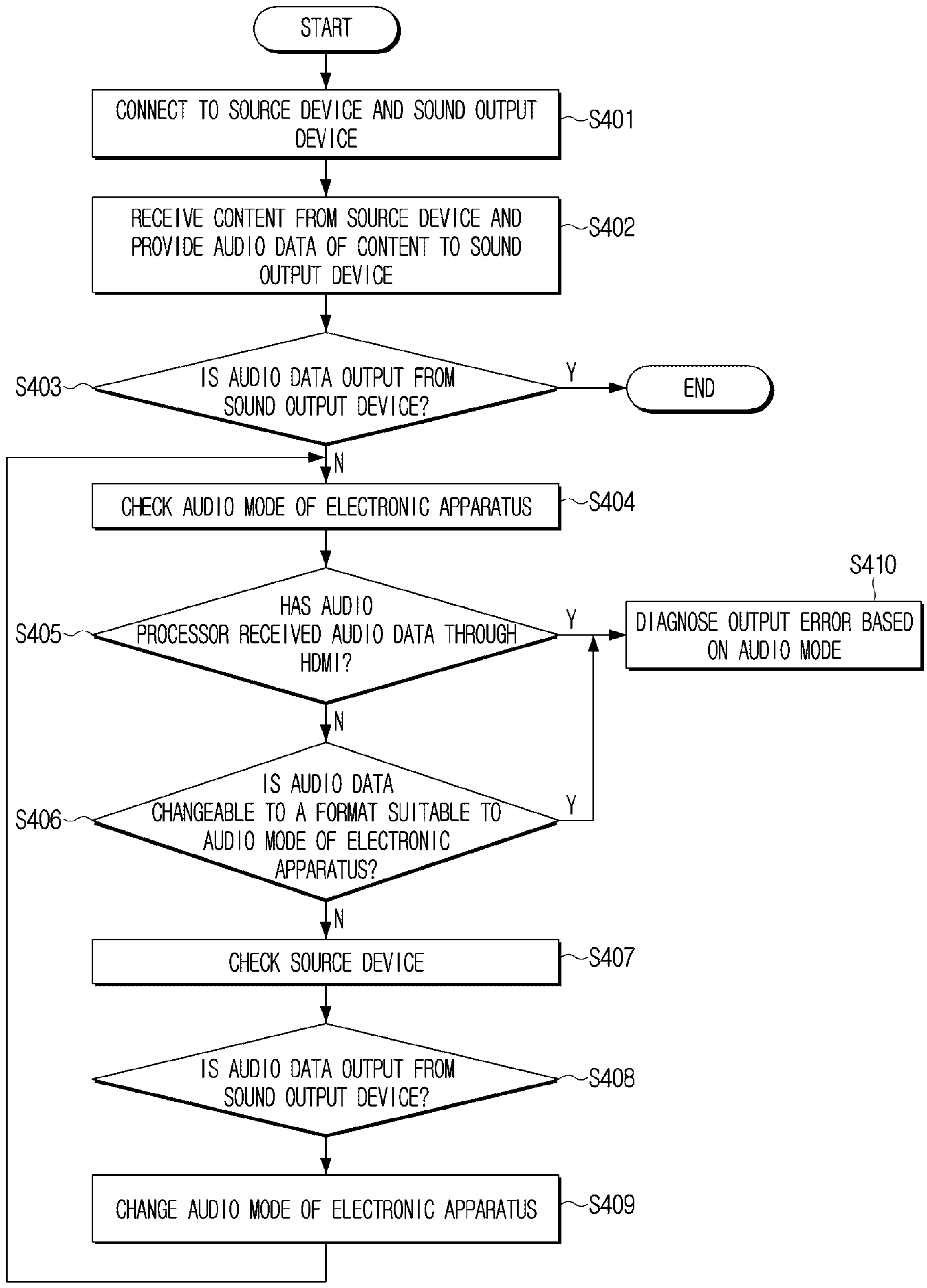
FIG. 4 is a flowchart illustrating an operation of an electronic apparatus according to an example embodiment.

FIG. 4 is a flowchart illustrating an operation of an electronic apparatus according to an example embodiment. Specifically, FIG. 4 is a flowchart illustrating the electronic apparatus 100 diagnosing an audio output error when audio data is not output from the sound output device 300, and performing reconnection with the source device 200 or the sound output device 300 or changing the audio mode of the electronic apparatus 100.

The processor 120 may be connected with the source device 200 and the sound output device 300 through the HDMI port (S401).

At this time, the processor 120 may check whether the source device 200 and the sound output device 300 are connected using a hot plug detect signal.

The hot plug detect signal may be a signal standard for determining whether the HDMI cable is connected or unconnected according to the HDMI standard. When the electronic apparatus 100 is connected, directly or indirectly, with the source device 200 and the sound output device 300 through the HDMI cable, voltage (that is, hot plug detect signal) detected through a specific pin of the HDMI port is transitioned from 0V to a preset volt (e.g., 5V).

In this case, the source device 200 or the sound output device 300 may recognize that it is connected, directly or indirectly, with the electronic apparatus through the HDMI cable, and read EDID information of the electronic apparatus 100. If the audio mode of the electronic apparatus 100 is in the eARC mode, the processor 120 may recognize that it is connected, directly or indirectly, with the sound output device 300 through the HDMI cable and update the EDID of the electronic apparatus 100 by reading Capability Data Structure (CDS) information of the sound output device 300 from the sound output device 300. Here, CDS information may indicate audio information that is receivable from the sound output device 300 which supports the eARC function.

The processor 120 may receive content from the source device 200 and provide audio data of the content to the sound output device 300 (S402). Specifically, the processor 120 may receive, based on EDID information provided when connecting with the source device 200, content that is reproducible in the electronic apparatus 100 from the source device 200. In addition, the processor 120 may provide, based on CDS information received from the sound output device 300 when connecting with the sound output device 300, audio data that is outputtable from the sound output device 300.

In the connection process, audio data may not be output from the sound output device 300 due to various reasons such as a transmission error of EDID information or a cable connection error with the source device 200 or the sound output device 300.

In this case, the processor 120 may check whether audio data is being output from the sound output device 300 (S403).

The processor 120 may check whether audio data is being output from the sound output device 300 using at least one from among a feedback signal received from the sound output device 300, audio data transmitted from the electronic apparatus 100 to the sound output device 300, and a volume value of the electronic apparatus 100.

Specifically, the processor 120 may check the volume value set in the electronic apparatus 100 and check whether the audio data is changed to a form suitable to the audio mode and output. In addition, the processor 120 may determine whether audio data transmitted to the sound output device 300 is present through the audio transmitter 114, and check whether audio data is output to the sound output device 300. Then, the processor 120 may receive the feedback signal from the sound output device 300, and check whether the sound output device 300 received the audio data and output the received audio data. Additionally, the processor 120 may check whether the sound output device 300 outputs the audio data through a microphone (not shown) included in the electronic apparatus 100 or an external microphone (not shown) connected with the electronic apparatus 100.

When it is verified that the audio data is not being output from the sound output device 300 (S403—N), the processor 120 may check the audio mode of the electronic apparatus 100 (S404). The processor 120 may check the audio mode of the electronic apparatus 100 based on an audio mode setting value set in the electronic apparatus 100.

Then, the processor 120 may check whether the audio processor 130 receives the audio data through the HDMI (S405), and diagnose the sound output error as an output error of the source device 200 or an output error of the sound output device 300 based on a verification result.

The audio processor 130 receiving audio data from the HDMI Rx 111 (S405—Y) may indicate that the HDMI Rx 111 extracted audio data from the content received from the source device 200, that is, that there is no output error present in the source device 200.

In this case (S405—Y), the processor 120 may diagnose the output error generated from the connection with the sound output device 300 based on the audio mode (S410). The above will be described below in FIG. 6 and FIG. 7.

Based on the audio processor 130 not receiving audio data from the HDMI Rx 111 (S405—N), that is, based on there being no audio data transmitted from the HDMI Rx 111 to the audio processor 130 present, the processor 120 may check whether the audio data received from the source device 200 is audio data that is changeable to a format suitable to the audio mode of the electronic apparatus 100 (S406).

Specifically, the processor 120 may use channel status bits information included in the audio data received from the source device 200 and identify whether the audio data is audio data that is changeable to a format suitable to the audio mode of the electronic apparatus 100. Here, channel status bits information may be information included in the content the source device 200 transmitted to the electronic apparatus, and may include various information such as a format, a frequency, and size information of audio data.

If the audio data received from the source device 200 is changeable to a format suitable to the audio mode of the electronic apparatus 100, that is, if the channel status bits information is included in an audio data specification that is supportable in the electronic apparatus 100, it is indicative of the source device 200 having transmitted audio data suitable to the electronic apparatus 100 and thus, the processor 120 may diagnose the output error based on the audio mode (S410). The above will be described below in FIG. 6 and FIG. 7.

If the audio data received from the source device 200 is not changeable to audio data suitable to the audio mode of the electronic apparatus 100 (S406—N), the processor 120 may diagnose as an output error of the source device 200, and check the source device 200 (S407).

Specifically, the processor 120 may change the hot plug detect signal associated with the communication with the source device 200 from a low state to a high state, that is, perform toggling, and perform reconnection with the source device 200. More specifically, when the electronic apparatus 100 is connected, directly or indirectly, with the source device 200, the hot plug detect signal is changed to the high state and maintained, and the processor 120 may perform reconnection with the source device 200 by changing the hot plug detect signal that is being maintained in the high state to the low state, and then changing back from the low state to the high state.

Figure 5:
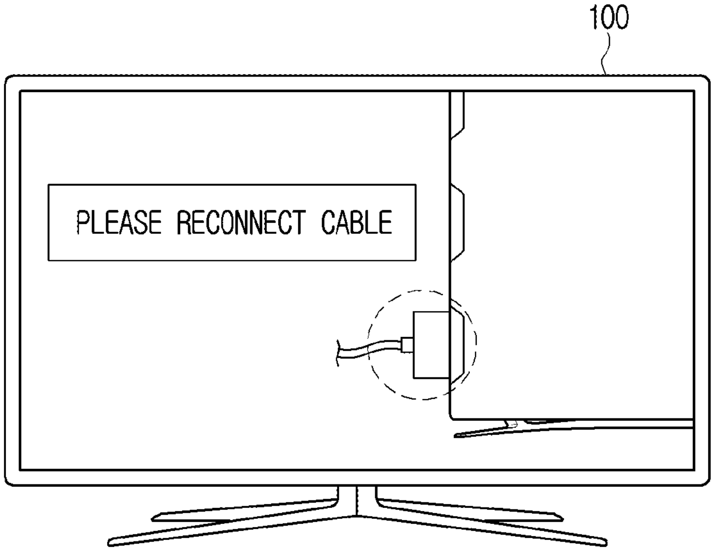
FIG. 5 is a diagram illustrating an electronic apparatus providing output error information to a user according to an example embodiment.

According to an embodiment, the processor 120 may control, as shown in FIG. 5, a display (not shown) to display a screen that guides reconnection of the HDMI cable connected with the source device 200.

At this time, the processor 120 may control the display (not shown) to display a screen in which the HDMI port and the HDMI cable connected with the source device 200 are displayed for a user to easily identify the HDMI cable connected, directly or indirectly, with the source device 200. In FIG. 5, although the HDMI port and the HDMI cable of the electronic apparatus 100 is displayed, the HDMI port and the HDMI cable of the source device 200 may be displayed according to an embodiment.

After performing reconnection with the source device 200, the processor 120 may check whether audio data is being output from the sound output device 300 (S408). Because the description thereof is same as that described in operation S403, redundant description thereof will be omitted.

When it is verified that the audio data of the content is not being output from the sound output device 300 even after having performed reconnection with the source device 200, the processor 120 may change the audio mode of the electronic apparatus 100 (S409). Specifically, the audio mode of the electronic apparatus 100 may be changed to the ARC mode when in the eARC mode, and the audio mode may be changed to the embedded speaker mode when the audio mode of the electronic apparatus 100 is in the ARC mode.

Then, the processor 120 may repeat operation S404 again and diagnose the sound output error of the electronic apparatus 100.

Figure 6:
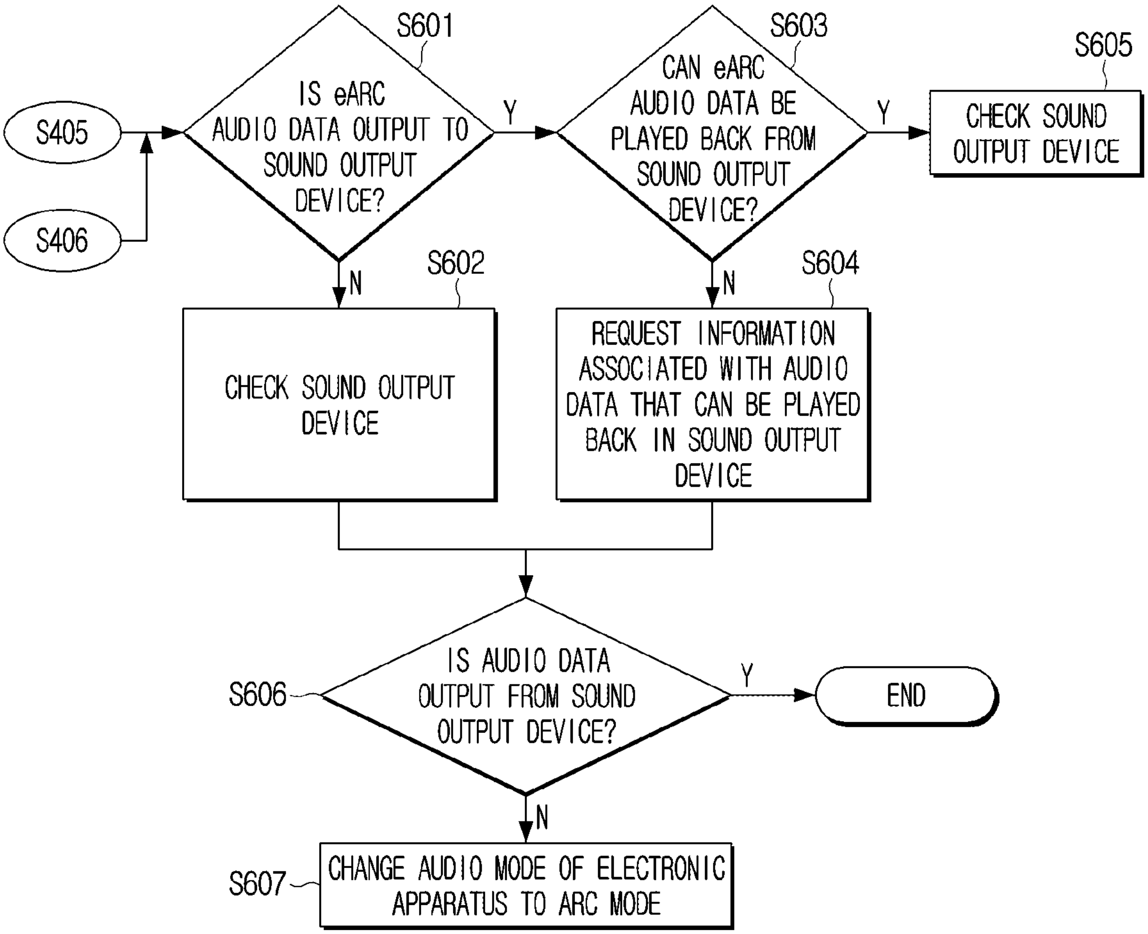
FIG. 6 is a diagram illustrating an operation of an electronic apparatus diagnosing a sound output error when in eARC mode according to an example embodiment.

FIG. 6 is a diagram illustrating an operation of an electronic apparatus diagnosing a sound output error when in eARC mode according to an example embodiment.

If the audio mode of the electronic apparatus is in the eARC mode, the processor 120 may sequentially check whether audio is received in the audio processor 130 (S405 of FIG. 4), whether audio data received from the source device 200 is changeable (S406 of FIG. 4), whether the received audio signal is output (S601), and audio information that is reproducible from an audio output device 300 (S603), and diagnose at least one output error from among the source device 200 or the sound output device 300.

If the audio processor 130 receives audio data through the HDMI (S405-Y of FIG. 4), or if the audio data is changeable to the audio data suitable to the audio mode of the electronic apparatus 100 (S406-Y of FIG. 4), the processor 120 may check whether the eARC audio data changed by the audio processor 130 is output to the sound output device 300 (S601).

Specifically, the processor 120 may check whether the eARC audio data is transmitted to the sound output device 300 through the eARC transmitter 113 within the audio transmitter 114.

When the audio data is changed to the audio data (eARC audio data) suitable to the audio mode (eARC audio mode)

and verified as not being output to the sound output device 300 (S601—N), the processor 120 may check the sound output device 300 (S602).

Specifically, the processor 120 may change the hot plug detect signal associated with the communication with the sound output device 300 from the low state to the high state, that is, perform toggling, and perform reconnection with the sound output device 300. More specifically, when the electronic apparatus 100 is connected, directly or indirectly, with the sound output device 300, the hot plug detect signal is changed to the high state and maintained, and the processor 120 may perform reconnection with the sound output device 300 by changing the hot plug detect signal that is being maintained in the high state to the low state, and then changing back from the low state to the high state.

As described above in FIG. 5, the processor 120 may control the display (not shown) to display a screen that guides reconnection of the HDMI cable connected with the sound output device 300. Because the description for the above is same as with when the source device 200 of FIG. 5 is changed to the sound output device 300, the detailed description thereof will be omitted.

When the audio data is changed to audio data according to the audio mode and verified as being output to the sound output device 300 (S601—Y), the processor 120 may identify whether the changed audio data is audio data that is reproducible from the sound output device 300 (S603).

Specifically, the processor 120 may check whether the changed audio data is audio data that is reproducible from the sound output device 300 based on CDS information received from the sound output device 300 when connecting with the sound output device 300.

If the changed audio data is audio data that is reproducible from the sound output device 300 (S603—Y), the processor 120 may check the sound output device 300 (S605).

At this time, based on the electronic apparatus 100 transmitting the eARC audio data to the sound output device 300 through the eARC transmitter 113 and the eARC audio data that is transmitted being audio data that is reproducible from the sound output device 300, the processor 120 may not transmit the hot plug detect signal to the sound output device 300 through a HDMI port 116 for the HDMI port 116 to be used in transmitting the eARC audio data. Instead, the processor 120 may perform a same operation as performing hot plug detect by way of software implementation and may be reconnected with the sound output device 300.

If the changed audio data is audio data that is not reproducible from the sound output device 300 based on an identified result (S603—N), the processor 120 may request information on audio data that is reproducible from the sound output device 300 to the sound output device 300 (S604). Specifically, the processor 120 may control the communication interface 110 to transmit a signal requesting information (CDS information) on audio data that is reproducible from the sound output device 300 to the sound output device 300.

The processor may check, after checking the sound output device (S602, S605), or after requesting information associated with audio data that is reproducible in the sound output device 300 (S604), whether audio data is output from the sound output device 300 (S606). Because the description of the above is same as the description of operation S404 in FIG. 4, redundant descriptions thereof will be omitted.

After requesting information associated with audio data that is reproducible in the sound output device 300 (S604) or if audio data of the content is not output from the sound output device 300 even after reconnection (S606—N), the processor 120 may change the audio mode of the electronic apparatus 100 from the eARC mode to the ARC mode (S607).

Then, the processor 120 may diagnose the sound output error from the ARC mode.

Figure 7:
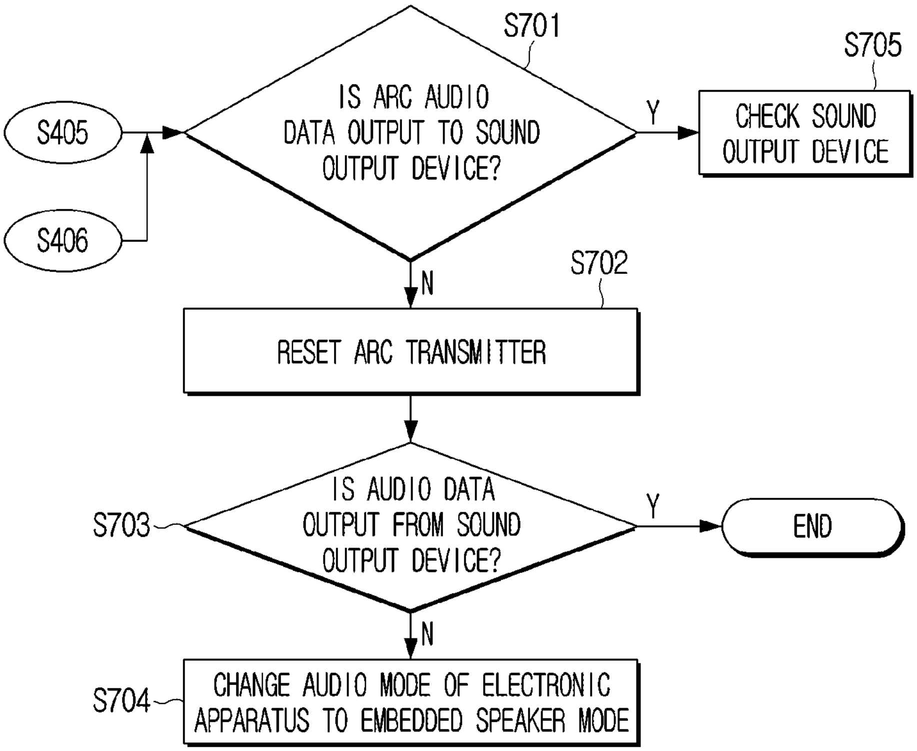
FIG. 7 is a diagram illustrating an operation of an electronic apparatus diagnosing a sound output error when in ARC mode according to an example embodiment.

FIG. 7 is a diagram illustrating an operation of an electronic apparatus diagnosing a sound output error when in ARC mode according to an example embodiment.

If the audio mode of the electronic apparatus 100 is in the ARC mode, the processor 120 may sequentially check whether audio is received in the audio processor 130 (S405 of FIG. 4), whether audio data received from the source device 200 is changeable (S406 of FIG. 4), and whether audio data is output (S701), and diagnose at least one output error from among the source device or the sound output device.

If the audio processor 130 receives the audio data through the HDMI (S405—Y of FIG. 4), or if the audio data is changeable to the audio data suitable to the audio mode of the electronic apparatus 100 (S406—Y of FIG. 4), the processor 120 may check whether the ARC audio data changed by the audio processor 130 is output to the sound output device 300 (S701).

Specifically, the processor 120 may check whether the ARC audio data is transmitted to the sound output device 300 through the ARC transmitter 112 within the audio transmitter 114.

When the audio data is changed to the ARC audio data suitable to the ARC audio mode and verified as not being output to the sound output device 300 (S701—N), the processor 120 may reset the ARC transmitter 112 (S702). Here, the resetting the ARC transmitter 112 may indicate resetting a signal that is output through the ARC transmitter.

When the audio data is changed to the ARC audio data suitable to the ARC audio mode and verified as being output to the sound output device 300 (S701—Y), the processor 120 may check the sound output device 300 (S705). Because the description associated with checking the sound output device 300 is same as with operation S602 in FIG. 6, redundant descriptions thereof will be omitted.

After resetting the ARC transmitter 112 (S702) or checking the sound output device 300 (S705), the processor 120 may check whether the audio data is output from the sound output device 300 (S703). Because the description on the above is same as with operation S404 in FIG. 4, redundant descriptions thereof will be omitted.

Even after resetting the ARC transmitter 112 (S702) or checking the sound output device 300 (S705) and the audio data is not output from the sound output device 300 (S703—N), the processor 120 may change the audio mode of the electronic apparatus 100 to the embedded speaker mode (S704).

Accordingly, the processor 120 may output the audio data through a speaker (not shown) included in the electronic apparatus 100 and not the external sound output device 300.

Figure 8:
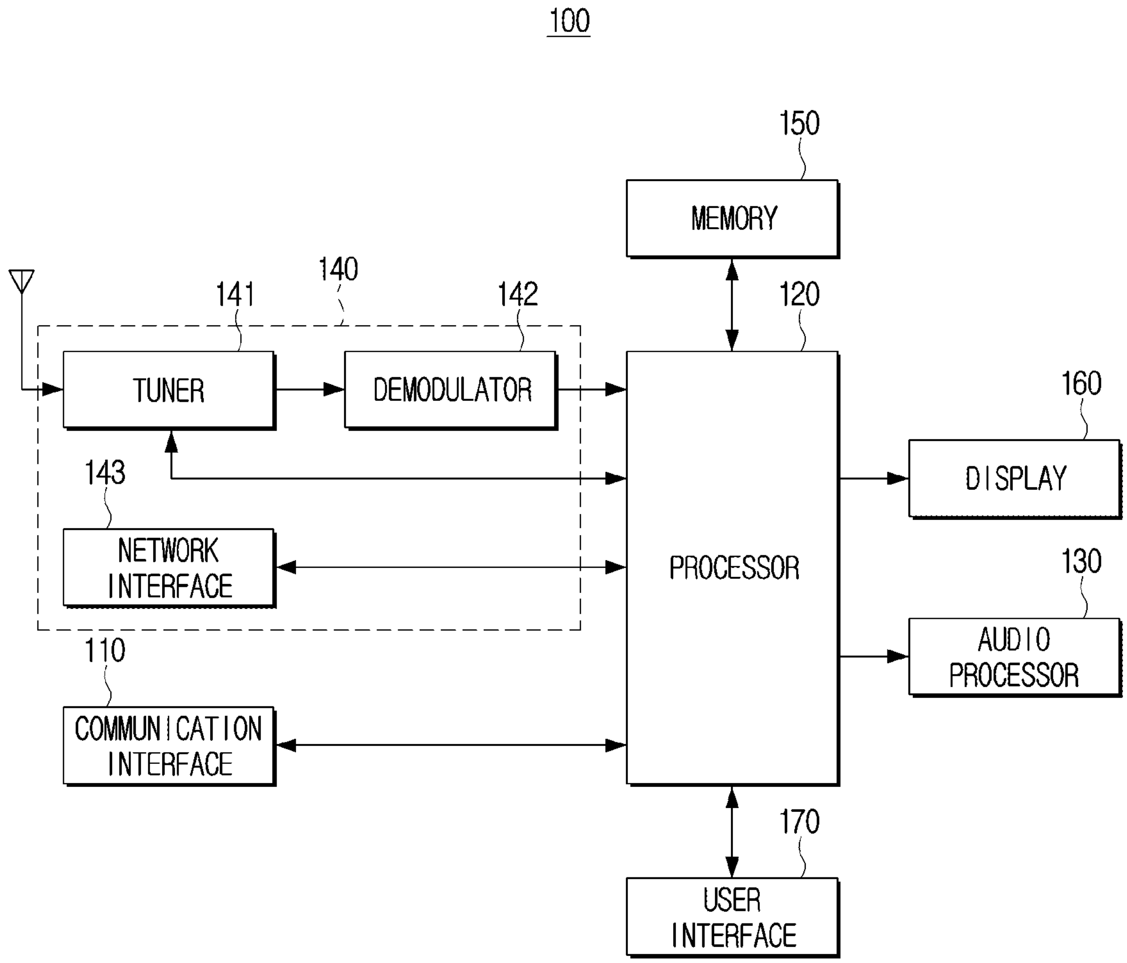
FIG. 8 is a block diagram illustrating a detailed configuration of an electronic apparatus according to an example embodiment.

FIG. 8 is a block diagram illustrating a detailed configuration of an electronic apparatus according to an example embodiment.

Referring to FIG. 8, the electronic apparatus 100 may include the communication interface 110, the processor 120, the audio processor 130, a receiver 140, a memory 150, a display 160, and a user interface 170. Descriptions which overlap with the communication interface 110, the processor 120, and the audio processor 130 described above in FIG. 2 and FIG. 3 from among the configurations shown in FIG. 8 will be omitted.

The communication interface 110 may further include various wired/wireless interfaces to which external devices can be connect in addition to the above-described HDMI port. For example, wired interfaces which include, for example, and without limitation, a USB terminal, a Composite Video Banking Sync (CVBS) terminal, a component terminal, an S-video terminal (analog), a Digital Visual Interface (DVI) terminal, and the like, and wireless interfaces which use communication protocols such as, for example, and without limitation, Wireless LAN (WLAN), Wireless-Fidelity (Wi-Fi), Wireless Fidelity (Wi-Fi) Direct, Bluetooth, Radio Frequency Identification (FID), infrared Data Association (IrDA), Ultra Wideband (UWB), ZigBee, Digital Living Network Alliance (DLNA), and the like may be included.

The receiver 140 may include at least one tuner 141, a demodulator 142, and a network interface 143. In certain cases, the receiver 140 may include the tuner 141 and the demodulator 142, but not the network interface 143, and vice versa. The tuner 141 may tune a channel selected by the user or all pre-stored channels from among Radio Frequency (RF) broadcast signals received through an antenna and receive the RF broadcast signal. The demodulator 142 may receive and demodulate a digital IF signal (DIF) changed from the tuner 141, and perform channel demodulation, and the like.

The network interface 143 may provide an interface for connecting the electronic apparatus 100 with a wired or wireless network which includes an internet network. The network interface 143 may include, for example, and without limitation, an Ethernet terminal, and the like for connecting with the wired network, and use communication standards, such as, for example, Wireless LAN (WLAN) (e.g., Wi-Fi), Wireless broadband (Wibro), World Interoperability for Microwave Access (Wimax), and High Speed Downlink Packet Access (HSDPA) for connecting with the wireless network.

The memory 150 may store a program for processing and controlling each signal within the processor 120, and store image, voice or data signals which have been signal processed. In addition, the memory 150 may perform a function for temporarily storing the image, voice or data signals which are input from the communication interface 110 or the network interface 143. In addition, in the memory 150, EDID information of the electronic apparatus 100 may be stored.

The display 160 may generate a driving signal by changing an image signal, a data signal, and an OSD signal processed from the processor 120 or an image signal, a data signal, and the like received from an external interface (not shown) to R, G, B signals, respectively. The display 160 may be implemented as a PDP, an LCD, an OLED, a flexible display, a 3-dimensional display (3D display), touch screen, and the like.

The user interface 170 may transfer a command input by the user to the processor 120 or transfer a signal of the processor 120 to the user. For example, the user interface 170 may be implemented, based on various communication methods such as, for example, and without limitation, a RF communication method, an IR communication method, and the like, in a form of performing communication with a remote control device (not shown), or in a form of a key panel provided in the electronic apparatus 100.

Figure 9:
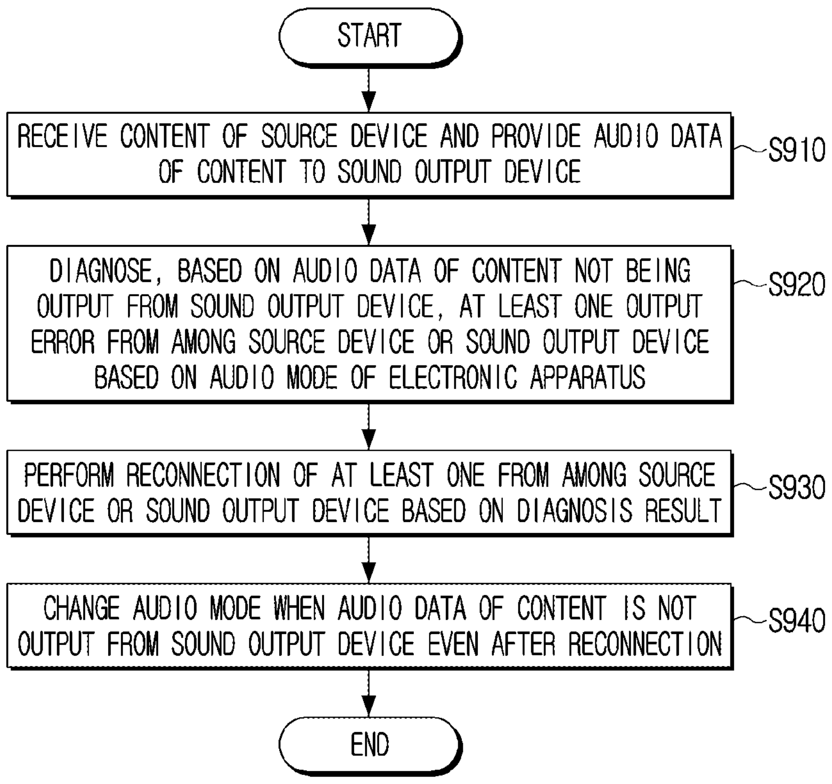
FIG. 9 is a flowchart illustrating a control method of an electronic apparatus according to an example embodiment.

FIG. 9 is a flowchart illustrating a control method of an electronic apparatus according to an example embodiment.

The electronic apparatus 100 may be connected, directly or indirectly, with the source device 200 and the sound output device 300. That this time, the source device 200 and the sound output device 300 may be connected, directly or indirectly, with the electronic apparatus 100 through the HDMI, respectively.

A content of the source device 200 may be received and audio data of the content may be provided to the sound output device 300 (S910).

Then, whether the audio data of the transmitted content is being output from the sound output device 300 may be checked.

Specifically, whether the audio data is being output from the sound output device 300 may be checked using at least one from among a feedback signal received from the sound output device 300, the audio data that is transmitted from the electronic apparatus 100 to the sound output device 300, and a volume value of the electronic apparatus 100.

Based on audio data of a content not being output from the sound output device 300, at least one output error from among the source device or the sound output device may be diagnosed based on an audio mode of the electronic apparatus 100 (S920). Here, the audio mode may include the eARC mode, the ARC mode, and the embedded speaker mode.

When the audio mode of the electronic apparatus 100 is in the enhanced Audio Return Channel mode, whether audio is received in the audio processor, whether the audio data received from the source device 200 is changeable, whether the audio data is output from the electronic apparatus 100, and the audio information outputtable from the audio output device 300 may be sequentially checked and at least one output error from among the source device 200 or the sound output device 300 may be diagnosed.

When the audio mode of the electronic apparatus 100 is in the Audio Return Channel (ARC) mode, whether the audio data is received in the audio processor, whether the audio data received from the source device 200 is changeable, and whether the audio data is output from the electronic apparatus 100 may be sequentially checked and at least one output error from among the source device 200 or the sound output device 300 may be diagnosed.

Specifically, whether the audio data is audio data that is changeable to a format suitable to the audio mode of the electronic apparatus 100 may be identified using channel status bits information included in the audio data, and if the audio data is not changeable to a format suitable to the audio mode of the electronic apparatus 100, it may be diagnosed as an output error of the source device 200.

Whether the audio processor included in the electronic apparatus 100 according to an embodiment receives the audio data through the HDMI may be checked, and based on the verification result, it may be diagnosed as an output error of the source device.

According to another embodiment, after the audio processor included in the electronic apparatus 100 receives audio data through the HDMI, the audio data may be changed to audio data suitable to the audio mode and whether the changed audio data is output to the sound output device 300 may be checked, and based on the verification result, it may be diagnosed as an output error of the sound output device.

Alternatively, when the audio data is changed to audio data suitable to the audio mode and verified as being output to the sound output device 300, it may be identified as to whether the changed audio data is audio data that is reproducible from the sound output device 300, and when the changed audio data is audio data that is not reproducible from the sound output device 300 based on the verification result, information associated with audio data that is reproducible from the sound output device may be requested to the sound output device.

Then, reconnection of at least one from among the source device 200 or the sound output device 300 may be performed based on the diagnosis result (S930). "Based on" as used herein covers based at least on.

Specifically, reconnection with the source device 200 or the sound output device 300 may be performed by changing the hot plug detect signal associated with communication with at least one from among the source device 200 or the sound output device 300 from the low state to the high state.

When the audio data of the content is not output from the sound output device 300 even after reconnection, the audio mode may be changed (S940). Specifically, the eARC mode may be changed to the ARC mode, and the ARC mode may be changed to the embedded speaker mode.

In the above, the electronic apparatus 100 or various operations described as being performed through the electronic apparatus 100 may be performed through at least one electronic apparatus in a control method of the electronic apparatus or in an operation method form.

The various embodiments described above may be implemented in a recordable medium which is readable by a computer or a device similar to the computer using software, hardware, or the combination of software and hardware.

According to a hardware implementation, example embodiments described in the disclosure may be implemented using at least one from among application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions.

In certain cases, embodiments described herein may be implemented by the processor itself. According to a software implementation, embodiments such as the procedures and functions described herein may be implemented with separate software modules. The respective software modules described above may perform one or more functions and operations described herein. The term "software module" as used herein may comprise processing circuitry.

The computer instructions for performing processing operations in a user device or administrator device according to the various embodiments described above may be stored in a non-transitory computer-readable medium. The computer instructions stored in this non-transitory computer-readable medium may cause a specific device described above to perform a processing operation of the user device and/or the administrator device according to the above-described various embodiments when executed by a processor of the specific device.

The non-transitory computer readable medium may refer to a medium that stores data semi-permanently rather than storing data for a very short time, such as a register, a cache, a memory, or the like, and is readable by a device. Specifically, the various applications or programs described above may be stored and provided in the non-transitory computer-readable medium such as, for example, and without limitation a compact disc (CD), a digital versatile disc (DVD), a hard disc, a Blu-ray disc, a USB, a memory card, a read only memory (ROM), and the like.

While the disclosure has been illustrated and described with reference to various example embodiments thereof, it will be understood that the various example embodiments are intended to be illustrative, not limiting. It will be understood by those skilled in the art that various changes in form and details may be made therein without departing from the true spirit and full scope of the disclosure, including the appended claims and their equivalents. It will also be understood that each embodiment herein may be used in combination with any other embodiment(s) described herein.

What is claimed is:

1. A control method by an electronic apparatus connected with a source device and a sound output device, the method comprising:

receiving, by the electronic apparatus, content of the source device and providing audio data of the content to the sound output device;

based on audio data of the content not being output from the sound output device, identifying an audio mode among a plurality of audio modes supported by the electronic apparatus including an Audio Return Channel (ARC) mode, an enhanced Audio Return Channel (eARC) mode, and an embedded speaker mode;

based on the identified audio mode, selecting at least one piece of information indicating whether the audio data is received in an audio processor comprised in the electronic apparatus, whether the audio data received from the source device is changeable, whether the audio data is output from the electronic apparatus, or audio information outputtable from the audio output device and diagnosing whether a cause of an output error exists in at least one of the source device or the sound output device based on the selected information;

based on a result of the diagnosing, performing reconnection with at least one of the source device or the sound output device in which the cause of the output error is determined to exist; and changing the audio mode, based on audio data of the content not being output from the sound output device even after the reconnection.

2. The method of claim 1, wherein the diagnosing comprises:

checking whether an audio processor comprised in the electronic apparatus receives the audio data through a High-Definition Multimedia Interface (HDMI);

identifying whether the audio data comprises audio data that is changeable to a format suitable to the audio mode of the electronic apparatus using at least channel status bits information comprised in the audio data; and diagnosing as an output error of the source device based on the audio processor not receiving the audio data, and/or the audio data not being changeable to a format suitable to the audio mode of the electronic apparatus.

3. The method of claim 1, wherein the diagnosing comprises:

checking, based on an audio processor comprised in the electronic apparatus receiving the audio data through the HDMI, whether the audio data is changed to audio data suitable to the audio mode and output to the sound output device; and diagnosing as an output error of the sound output device based on the identification result.

4. The method of claim 1, wherein the diagnosing comprises:

identifying, based on the audio data being changed to audio data suitable to the audio mode and verified as being output to the sound output device, whether the changed audio data is audio data that is reproducible from the sound output device, and the control method further comprising:

requesting, based on the changed audio data being audio data that is not reproducible from the sound output device based on the identification result, information associated with audio data that is reproducible from the sound output device to the sound output device.

5. The control method of claim 1, wherein the diagnosing comprises:

sequentially checking, based on the audio mode of the electronic apparatus being in an enhanced Audio Return Channel (eARC) mode, whether the audio data is received in an audio processor comprised in the electronic apparatus, whether the audio data received from the source device is changeable, whether the audio data is output from the electronic apparatus, and audio information outputtable from the audio output device and diagnosing at least one output error from among the source device and/or the sound output device.

6. The method of claim 1, wherein the diagnosing comprises:

sequentially checking, based on the audio mode of the electronic apparatus being in an Audio Return Channel (ARC) mode, whether the audio data is received in an audio processor comprised in the electronic apparatus, whether the audio data received from the source device is changeable, and whether the audio data is output from the electronic apparatus, and diagnosing at least one output error from among the source device and/or the sound output device.

7. The method of claim 1, wherein the source device and the audio output device are connected through at least a High-Definition Multimedia Interface (HDMI).

8. The method of claim 1, wherein the performing reconnection comprises:

performing reconnection with the source device and/or the sound output device at least by changing a hot plug detect signal associated with communication with at least one from among the source device and/or the sound output device from a low state to a high state.

9. The method of claim 1, wherein the diagnosing comprises:

checking whether the audio data is output from the sound output device using at least one from among a feedback signal received from the sound output device, audio data that is transmitted from the electronic apparatus to the sound output device, and a volume value of the electronic apparatus; and diagnosing, based on verifying that the audio data is not being output from the sound output device, at least one output error from among the source device and/or the sound output device based on the audio mode of the electronic apparatus.

10. An electronic apparatus, comprising:

an audio processor;

a communication interface, comprising circuitry, configured to perform communication with a source device and a sound output device; and at least one processor comprising processing circuitry, the at least one processor, individually and/or collectively, configured to:

control the communication interface to receive a content of the source device and provide audio data of the content to the sound output device, based on audio data of the content not being output from the sound output device, identify an audio mode among a plurality of audio modes supported by the electronic apparatus including an Audio Return Channel (ARC) mode, an enhanced Audio Return Channel (eARC) mode, and an embedded speaker mode, based on the identified audio mode, select at least one piece of information indicating whether the audio data is received in the audio processor, whether the audio data received from the source device is changeable, whether the audio data is output from the electronic apparatus, or audio information outputtable from the audio output device and diagnose whether a cause of an output error exists in at least one of the source device or the sound output device based on the selected information, based on a result of the diagnosing, perform reconnection with at least one of the source device or the sound output device in which the cause of the output error is determined to exist, and change the audio mode, based on audio data of the content not being output from the sound output device even after the reconnection.

11. The electronic apparatus of claim 10, wherein the communication interface comprises a High-Definition Multimedia Interface (HDMI), and wherein the at least one processor, individually and/or collectively, is configured to:

check whether the audio processor receives the audio data through the HDMI, identify whether the audio data comprising audio data that is changeable to a format suitable to an audio mode of the electronic apparatus using channel status bits information comprised in the audio data, and diagnose as an output error of the source device based on the audio processor not receiving audio data, and/or the audio data not being changeable to a format suitable to an audio mode of the electronic apparatus.

12. The electronic apparatus of claim 10, wherein the communication interface comprises a High-Definition Multimedia Interface (HDMI), and wherein the at least one processor, individually and/or collectively, is configured to:

check, based on the audio processor receiving the audio data through the HDMI, whether the audio data is changed to audio data suitable to the audio mode and output to the sound output device, and diagnose as an output error of the sound output device based on the verification result.

13. The electronic apparatus of claim 10, wherein the at least one processor, individually and/or collectively, is configured to:

identify, based on the audio data being changed to audio data suitable to the audio mode and verified as being output to the sound output device, whether the changed audio data is audio data that is reproducible from the sound output device, and control, based on the changed audio data being audio data that is not reproducible from the sound output device based on the verification result, the communication interface to transmit a signal requesting information on audio data that is reproducible from the sound output device to the sound output device.

14. The electronic apparatus of claim 10, wherein the at least one processor, individually and/or collectively, is configured to:

sequentially check, based on the audio mode of the electronic apparatus being in an enhanced Audio Return Channel mode, whether the audio data is received in the audio processor, whether the audio data received from the source device is changeable, whether the audio data is output from the electronic apparatus, and audio information outputtable from the audio output device and diagnose at least one output error from among the source device and/or the sound output device.

15. The electronic apparatus of claim 10, wherein the at least one processor, individually and/or collectively, is configured to:

sequentially check, based on the audio mode of the electronic apparatus being in an Audio Return Channel (ARC) mode, whether the audio data is received in the audio processor, whether the audio data received from the source device is changeable, and whether the audio data is output from the electronic apparatus, and diagnose at least one output error from among the source device and/or the sound output device.

* * * * *